(12) United States Patent
Ohta (10) Patent No.: US 11,391,621 B2
(45) Date of Patent: Jul. 19, 2022

(54) VIBRATION MEASUREMENT APPARATUS, VIBRATION MEASUREMENT METHOD, AND COMPUTER-READABLE RECORDING MEDIUM

(71) Applicant: NEC Corporation, Tokyo (JP)

(72) Inventor: Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 146 days.

(21) Appl. No.: 16/763,067

(22) PCT Filed: Nov. 14, 2017

(86) PCT No.: PCT/JP2017/040947
§ 371 (c)(1),
(2) Date: May 11, 2020

(87) PCT Pub. No.: WO2019/097579
PCT Pub. Date: May 23, 2019

(65) Prior Publication Data
US 2020/0348166 A1  Nov. 5, 2020

(51) Int. Cl.
*G01H 9/00* (2006.01)
*G01M 5/00* (2006.01)

(52) U.S. Cl.
CPC .............. *G01H 9/00* (2013.01); *G01M 5/0008* (2013.01)

(58) Field of Classification Search
CPC .... G01H 9/00; G01M 5/0008; G01M 5/0066; G01M 5/0041

(Continued)

(56) References Cited

U.S. PATENT DOCUMENTS

2016/0040984 A1   2/2016 Byrne
2018/0052117 A1*  2/2018 Imai .................... G01M 5/0075
2018/0209883 A1*  7/2018 Imagawa ............... G01N 3/068

FOREIGN PATENT DOCUMENTS

JP    2003-156389 A    5/2003
JP    2005-283440 A   10/2005
(Continued)

OTHER PUBLICATIONS

English specification for JP2006313160, accessed from worldwide. espacenet.com Nov. 29, 2021.*

(Continued)

*Primary Examiner* — Nimeshkumar D Patel
*Assistant Examiner* — Jean F Morello
(74) *Attorney, Agent, or Firm* — Sughrue Mion, PLLC (57) ABSTRACT

A vibration measurement apparatus 10 is an apparatus for measuring vibrations of an object 30. The vibration measurement apparatus 10 includes: a surface-direction displacement calculation unit 11 configured to calculate, based on time-series images of a measurement target area that are output from an imaging apparatus 20, a displacement in a surface direction of the measurement target area; a normal-direction displacement calculation unit 12 configured to calculate a displacement in a normal direction of the measurement target area, based on the time-series images and the displacement in the surface direction of the measurement target area; and a vibration calculation unit 13 configured to calculate vibrations of the object 30, based on the calculated displacement in the surface direction of the measurement target area and the calculated displacement in the normal direction of the measurement target area.

15 Claims, 6 Drawing Sheets

(58) Field of Classification Search
USPC .......................................................... 73/655
See application file for complete search history.

(56) References Cited

FOREIGN PATENT DOCUMENTS

| | | | |
|---|---|---|---|
| JP | 2006343160 A | * | 12/2006 |
| JP | 2015-125128 A | | 7/2015 |
| JP | 2015-175827 A | | 10/2015 |
| WO | 2016/152075 A1 | | 9/2016 |
| WO | 2017/179535 A1 | | 10/2017 |

OTHER PUBLICATIONS

English specification for JP2015175827, accessed from worldwide.espacenet.com Nov. 29, 2021.*
English translation of Written opinion for PCT Application No. PCT/JP2017/040947, dated Jan. 23, 2018.
Japanese Office Action for JP Application No. 2019-554073 dated Jun. 1, 2021 with English Translation.
International Search Report for PCT Application No. PCT/JP2017/040947, dated Jan. 23, 2018.

* cited by examiner

VIBRATION MEASUREMENT APPARATUS, VIBRATION MEASUREMENT METHOD, AND COMPUTER-READABLE RECORDING MEDIUM

This application is a National Stage Entry of PCT/JP2017/040947 filed on Nov. 14, 2017, the contents of all of which are incorporated herein by reference, in their entirety.

TECHNICAL FIELD

The present invention relates to a vibration measurement apparatus and a vibration measurement method for measuring vibrations of a structure, and further relates to a computer-readable recording medium on which a program for realizing them is recorded.

BACKGROUND ART

Conventionally, a technique has been proposed for contactlessly measuring mechanical vibrations of an object from a remote place. Such a technique makes it unnecessary to attach or detach a sensor for detecting vibrations, and can realize efficient vibration measurement. Therefore, there is a need for such a technique especially in the field of maintenance and management, and abnormality detection, of infrastructural components such as bridges, roads, buildings, and facilities.

For example, Patent Document 1 discloses a vibration measurement apparatus that employs an imaging apparatus. The vibration measurement apparatus disclosed in Patent Document 1 measures vibrations of an object by acquiring time-series images of the object from the imaging apparatus, and performing image processing on the acquired time-series images. However, there is a problem in that the vibration measurement apparatus disclosed in Patent Document 1 can only measure vibration components in two-dimensional directions within the images, and cannot measure vibration components in the optical axis direction of the imaging apparatus.

Considering this problem, Patent Document 2 discloses a vibration measurement apparatus that employs, in addition to an imaging apparatus, a distance measurement apparatus such as a laser distance meter or an ultrasonic distance meter. The vibration measurement apparatus disclosed in Patent Document 2 can measure not only vibration components in two-dimensional directions within the images, but also vibration components in the optical axis direction of the imaging apparatus using the distance measurement apparatus. Therefore, the vibration measurement apparatus can measure vibrations of the object in three-dimensional directions.

LIST OF PRIOR ART DOCUMENTS

Patent Document

Patent Document 1: Japanese Patent Laid-Open Publication No. 2003-156389
Patent Document 2: Japanese Patent Laid-Open Publication No. 2005-283440

SUMMARY OF INVENTION

Problems to be Solved by the Invention

However, as in Patent Document 2, when an imaging apparatus and a distance measurement apparatus are used to measure three-dimensional vibrations, there is the problem that the accuracy of measuring particularly vibrations in a distance direction is likely to deteriorate. The following will describe the problem.

One of the characteristics of "when a distance measurement apparatus is performed by using another measurement apparatus" is that a distance measurement apparatus as disclosed in Patent Document 2 is likely to have a low repeat accuracy, in principle. To increase the accuracy, it is thus necessary to measure a distance multiple times and obtain an average thereof, and thus there is a trade-off relationship between the measurement accuracy and the sampling rate. The sampling rate practical for enhancing the stability and accuracy of the measurement is about 10 to 30 Hz. Particularly, if the distance from an object is large, the practical sampling rate tends to be low.

On the other hand, when vibration components in a two-dimensional direction are measured based on images, it is possible to measure vibration components in the two-dimensional direction at the sampling rate that is equal to the frame rate of the image capture. Typically, if the image capture is performed at about 60 Hz, vibration components in the two-dimensional direction can be calculated at 60 Hz. If it is necessary to perform measurement at a comparable sampling rate using the distance measurement apparatus disclosed in Patent Document 2 together, such a situation will occur that distance values measured by the distance measurement apparatus cannot sufficiently be averaged, and results of the measurement of vibrations in the distance direction will largely vary. Therefore, the accuracy of measuring vibrations in the distance direction is likely to deteriorate.

Furthermore, when vibration components in a two-dimensional direction are measured based on images, a displacement between the images is calculated, and thus vibration components in the two-dimensional direction can be measured at the moment at which the images are captured. On the other hand, as described above, the distance value measured by the distance measurement apparatus as disclosed in Patent Document 2 is obtained by averaging distance values measured multiple times in order to increase the accuracy and provide the stability. Accordingly, vibration components in the distance direction include a time-delay due to averaging, that is, a time lag with respect to vibration components in the two-dimensional directions. Accordingly, there is the problem that, out of three-dimensional vibration components, only vibration components in the distance direction include a delay and have different properties.

One of the characteristics of "when distance measurement is performed based on a pixel distance of a pair of laser makers in an image" is that an imaging apparatus can serve as both an imaging apparatus for capturing images based on which vibration components in two-dimensional directions are measured, and an imaging apparatus for capturing images based on which a distance component is measured based on the pixel distance of the pair of laser makers. Accordingly, the above-described defects caused when measurement is performed by using another measurement apparatus can be solved. However, in the case of such a configuration, it is necessary to emit laser light with restricted directivity because an image needs to be captured such that a laser irradiation point on the surface of a measurement object can be identified, and thus the dimension of a ranging point on the surface of the measurement object is inevitably small.

Here, if the surface of the measurement object is uneven, and the measurement object vibrates in three-dimensional directions, the position and height of the ranging point will change each time it is irradiated with the laser light. Accordingly, measured distance values will include an error caused due to the unevenness of the surface. Accordingly, in the above-described distance measurement apparatus, the ranging accuracy is not likely to increase, and as a result, the vibration measurement accuracy also deteriorates.

An example object of the invention is to provide a vibration measurement apparatus, a vibration measurement method, and a computer-readable recording medium that can solve the above-described problems, and can improve the accuracy of measuring vibrations of an object that vibrates three-dimensionally.

Means for Solving the Problems

To achieve the above-described object, a vibration measurement apparatus for measuring vibrations of an object, according to an example aspect of the invention, includes:

a surface-direction displacement calculation unit configured to calculate, based on time-series images of a measurement target area on the object that are output from an imaging apparatus, a displacement in a surface direction of the measurement target area;

a normal-direction displacement calculation unit configured to calculate a displacement in a normal direction of the measurement target area, based on the time-series images and the displacement in the surface direction of the measurement target area; and a vibration calculation unit configured to calculate vibrations of the object, based on the calculated displacement in the surface direction of the measurement target area and the calculated displacement in the normal direction of the measurement target area.

Furthermore, to achieve the above-described object, a vibration measurement method for measuring vibrations of an object, according to an example aspect of the invention, includes: the steps of:

(a) a step of calculating, based on time-series images of a measurement target area on the object that are output from an imaging apparatus, a displacement in a surface direction of the measurement target area;

(b) a step of calculating a displacement in a normal direction of the measurement target area, based on the time-series images and the displacement in the surface direction of the measurement target area; and (c) a step of calculating vibrations of the object, based on the calculated displacement in the surface direction of the measurement target area and the calculated displacement in the normal direction of the measurement target area.

Moreover, to achieve the above-described object, according to one aspect of the present invention, a computer-readable recording medium according to an example aspect of the invention, the computer-readable recording medium having recorded thereon a program for measuring vibrations of an object, using a computer, the program including instructions that cause the computer to carry out:

(a) a step of calculating, based on time-series images of a measurement target area on the object that are output from an imaging apparatus, a displacement in a surface direction of the measurement target area;

(b) a step of calculating a displacement in a normal direction of the measurement target area, based on the time-series images and the displacement in the surface direction of the measurement target area; and (c) a step of calculating vibrations of the object, based on the calculated displacement in the surface direction of the measurement target area and the calculated displacement in the normal direction of the measurement target area.

Advantageous Effects of the Invention

As described above, according to the invention, it is possible to calculate three-dimensional vibration components based on images captured by an imaging apparatus, and thus improve the accuracy of measuring vibrations of an object that vibrates.

EXAMPLE EMBODIMENT

Example Embodiment

Hereinafter, the vibration measurement apparatus, the vibration measurement method, and the program according to an example embodiment of the present invention will be described with reference to FIGS. 1 to 6.

Apparatus Configuration

Figure 1:
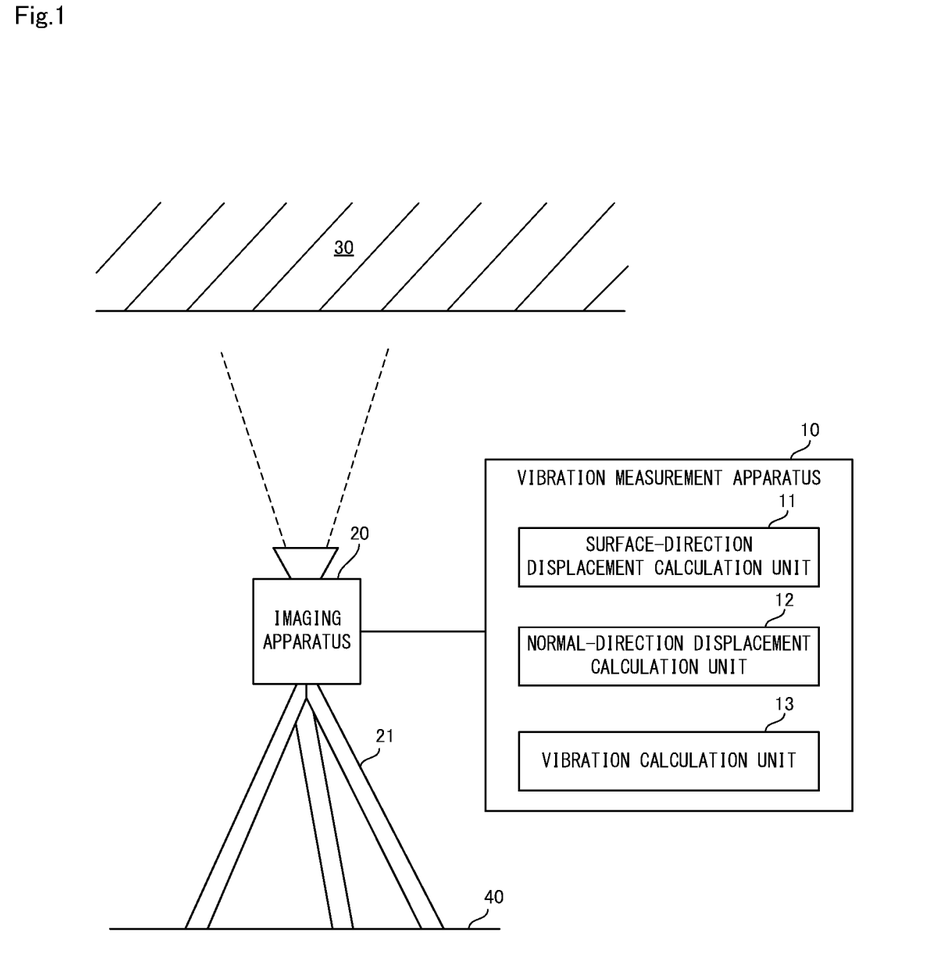
FIG. 1 is a block diagram illustrating a configuration of a vibration measurement apparatus according to an example embodiment of the present invention.

First, a configuration of the vibration measurement apparatus according to the present example embodiment will be described with reference to FIG. 1. FIG. 1 is a block diagram illustrating a configuration of the vibration measurement apparatus according to the example embodiment of the present invention.

A vibration measurement apparatus 10 according to the present example embodiment shown in FIG. 1 is an apparatus for measuring vibrations of an object 30. The vibration measurement apparatus 10 includes a surface-direction displacement calculation unit 11, a normal-direction displacement calculation unit 12, and a vibration calculation unit 13. Also, the vibration measurement apparatus 10 is connected to an imaging apparatus 20. The imaging apparatus 20 is arranged with a fixture 21 on a region (hereinafter, denoted as a "separated region") 40 (for example, the ground) that is separated from the object 30, so as to be able to capture an image of a measurement target area on the object 30.

The surface-direction displacement calculation unit 11 calculates, based on time-series images of the measurement target area on the object 30 output from the imaging apparatus 20, displacements in surface direction of the measurement target area. The normal-direction displacement calculation unit 12 calculates, based on the time-series images and the displacements in the surface direction of the measurement target area, displacements in a normal direction of the measurement target area. The vibration calculation unit 13 calculates vibrations of the object based on the calculated displacements in the surface direction of the measurement target area and the calculated displacements in the normal direction of the measurement target area.

Thus, in the present example embodiment, vibrations in the three-dimensional directions of the measurement target area on the object 30 are measured, based on the images of the measurement target area on the object 30 that are captured by the imaging apparatus 20. According to the present example embodiment, it is thus possible to improve the accuracy of measuring vibrations of a structure that vibrates.

In the present example embodiment, the object 30 is, for example, an infrastructural component such as a bridge, a road, a building, and a facility. Furthermore, the measurement target area is set to be located on the object 30. Specifically, in the present example embodiment, if the object 30 is a bridge, the measurement target area may be, for example, a predetermined area on the lower surface of a beam, a floor slab, or the like of the bridge.

Furthermore, in the present example embodiment, the object 30 is not limited to an infrastructural component, and may be any object as long as it moves or vibrates in three-dimensional directions. In the example of FIG. 1, the measurement target area is an area perpendicular to the vertical direction, such as the above-described lower surface of a beam, a floor slab, or the like of the bridge (see FIG. 1), but the present invention is not limited to this, and the measurement target area may be an area parallel to the vertical direction (for example, an area on a side surface such as a railing of the bridge).

The following will describe the configuration of the vibration measurement apparatus 10 of the present example embodiment more specifically. First, in the present example embodiment 1, as shown in FIG. 1, the imaging apparatus 20 is arranged with the fixture 21 on the separated region 40 such as the ground so that the imaging direction of the imaging apparatus 20 is parallel to the vertical direction, and a light receiving surface thereof is parallel to the measurement target area.

In other words, the imaging apparatus 20 is arranged so that the normal of the light receiving surface of a solid-state imaging element of the imaging apparatus 20 is parallel to the normal of the measurement target area, and the two-dimensional directions of captured time-series images (that is, the horizontal direction of the time-series images and the perpendicular direction of the time-series images) are parallel to the surface direction of the measurement target area. In this context, the surface direction of the measurement target area means the direction that is parallel to the surface of the measurement target area on the object 30. The horizontal direction of the time-series images is set as "X direction", the perpendicular direction of the time-series images is set as "Y direction", and the normal direction (vertical direction) of the measurement target area is set as "Z direction".

In the present example embodiment, the surface-direction displacement calculation unit 11 acquires time-series images output by the imaging apparatus 20, and sets an image captured at a certain time as a reference image, and sets another image as a processing image. Also, the surface-direction displacement calculation unit 11 searches for, for each of the processing images, an area of interest on the reference image, that is, a specific area that includes a measurement target area on the image (hereinafter, denoted as "specific area"), and calculates displacements ($d1x$, $d1y$) in the surface direction.

Specifically, the surface-direction displacement calculation unit 11 first compares the processing images with the reference image, and specifies, for each processing image, the position of the measurement target area that has the highest matching level. Also, the surface-direction displacement calculation unit 11 calculates the specified position, as a displacement $d1x$ in the X direction and a displacement $d1y$ in the Y direction. Examples of the method for searching for the measurement target area with the highest matching level include a method utilizing a similarity correlation function, such as the SAD (Sum of Squared Difference), the SSD (Sum of Absolute Difference), the NCC (Normalized Cross-Correlation), or the ZNCC (Zero-means Normalized Cross-Correlation), to search for the position (the coordinate point) with the highest correlation.

Also, fitting may be used as the method for searching for the measurement target area with the highest matching level. According to this method, it is possible to more accurately calculate the position (the coordinate point) of an area with a high degree of similarity on the order of sub-pixels. Specifically, the position (the coordinate point) with the highest matching level is searched for, and then the similarity correlation functions at front, rear, left, and right positions (the coordinate points) relative to the found position (the coordinate point) are calculated. Then, using the calculated similarity correlation functions at the respective coordinate points, a method such as linear fitting, curve fitting, or parabola fitting is applied to search for the position with the highest matching level between the coordinates. Accordingly, it is possible to calculate the position (the coordinate point) of an area with a high degree of similarity on the order of sub-pixels.

To calculate a displacement $d1z$ of the specific area in the normal direction, the normal-direction displacement calculation unit 12 creates a set of images (hereinafter, denoted as "set of reference images") by enlarging and reducing the reference image at predetermined magnifications. At this time, the normal-direction displacement calculation unit 12 sets the central positions of the enlarged images and the reduced images created from the reference image based on the previously calculated displacements ($d1x$, $d1y$) in the surface direction, to create a set of reference images.

Next, the normal-direction displacement calculation unit 12 compares each processing image with the enlarged images and the reduced images, and specifies one of the enlarged images and the reduced images that has the highest matching level. For example, any of the above-mentioned similarity correlation functions such as the SAD, the SSD, the NCC, and the ZNCC can be used to specify the image with the highest matching level. Then, the normal-direction displacement calculation unit 12 specifies, out of the images included in the set of reference images, the image with the highest degree of similarity, that is, the image with the highest correlation, and calculates the enlargement ratio or the reduction ratio (hereinafter, denoted as a "magnification") of the specified image as an amount ($d1z$) that indicates the displacement in the normal direction of the specific area.

Furthermore, after having specified the image with the highest matching level, the normal-direction displacement calculation unit 12 selects, from among the set of reference images, images before and after the specified image in order of magnifications, and calculates the similarity correlation functions between the specified image and the selected image. Also, the normal-direction displacement calculation unit 12 may calculate a magnification as the amount (d1z) indicating the displacement in the normal direction, using the calculated similarity correlation functions and employing a method such as linear fitting or curve fitting. As a result, it is possible to more accurately calculate the magnification (d1z) as the amount that indicates the displacement in the normal direction. In this way, the normal-direction displacement calculation unit 12 calculates the displacements (d1x, d1y) of the specific area in each processing image, and a magnification (d1z) thereof as an amount that indicates the displacement in the normal direction.

Furthermore, the surface-direction displacement calculation unit 11 and the normal-direction displacement calculation unit 12 may perform the above-described processing multiple times, in order to increase the accuracy of the displacement. Specifically, the surface-direction displacement calculation unit 11 selects an image that corresponds to the magnification d1z from among the images included in the set of reference images, taking into consideration the influence of the magnification d1z previously calculated by the normal-direction displacement calculation unit 12, and sets the selected image as a new reference image. Next, the surface-direction displacement calculation unit 11 compares a processing image with the new reference image to specify the similar position in the processing image that is the most similar to the new reference image, calculates the position thereof, and detects displacements (d2x, d2y) of the similar position.

Then, the normal-direction displacement calculation unit 12 sets the central position of enlargement or reduction of each of the images included in the set of reference images, based on the displacements (d2x, d2y) newly detected by the surface-direction displacement calculation unit 11, and creates a new set of reference images. Thereafter, the normal-direction displacement calculation unit 12 calculates the degree of similarity between a processing image and each of the images included in the new set of reference images, and specifies the image with the highest degree of similarity from among the images included in the new set of reference images. Thereafter, the normal-direction displacement calculation unit 12 calculates the magnification of the specified image as an amount (d2z) that indicates the displacement in the normal direction of the specific area.

In this way, in the first processing, the displacements (d1x, d1y) are calculated without taking into consideration d1z, which is the magnification indicating the displacement in the normal direction, whereas, in the second processing, the displacements (d2x, d2y) are calculated taking into consideration the magnification d1z. Accordingly, the displacements (d2x, d2y) in the second processing are calculated more accurately than the displacements calculated in the first processing. Furthermore, if the same processing is executed multiple times, the accuracy of the displacement will be further improved.

Note that, although the processing in the above-described example is repeated twice, the number of repetitions is not particularly limited. The number of repetitions may be a preset number, or may be set as appropriate according to the result. Alternatively, the processing may be repeated until the value of the calculated displacement reaches a threshold.

Also, in the following description, the displacements that are ultimately obtained for a given processing image are indicated by displacements (dnx, dny), and a magnification (dnz), which is an amount indicating the displacement in the normal direction. The results of similar calculation of the displacements for the time-series images can be regarded as values that change over time, and thus they are denoted as displacements (dnx(t), dny(t)) and a magnification (dnz(t)).

In the present example embodiment, the vibration calculation unit 13 first calculates a vibration in the surface direction of the measurement target area on the object 30, based on the displacement in the surface direction of the specific area, and information regarding imaging of the imaging apparatus 20. Then, the vibration calculation unit 13 calculates a vibration in the normal direction of the measurement target area on the object 30, based on the displacement in the normal direction of the specific area, and the distance between the imaging apparatus 20 and the object 30.

Specifically, the displacements (dnx(t), dny(t)) in the surface direction of the specific area are calculated in units of pixels. Accordingly, the vibration calculation unit 13 calculates the amounts ($\Delta x$, $\Delta y$) [mm] of movement in the X direction and the Y direction, using the lengths in the X direction and the Y direction (Dx, Dy) [mm/pixel] of each pixel of an imaging element of the imaging apparatus 20, as given by Formula 1 and Formula 2 below. Furthermore, the lengths (Dx, Dy) [mm/pixel] of each pixel of the imaging element can be calculated, as given Formulae 3 and 4 below, using pixel pitches (px, py) [mm] of the imaging element, the focal length f[mm] of the lens, and the distance L[mm] between the principal point of the lens and the measurement target area.

$$\Delta x = Dx \cdot dnx(t) \quad \text{(Formula 1)}$$

$$\Delta y = Dy \cdot dny(t) \quad \text{(Formula 2)}$$

$$Dx = px \cdot (L/f) \quad \text{(Formula 3)}$$

$$Dy = py \cdot (L/f) \quad \text{(Formula 4)}$$

Also, the displacement in the normal direction of the specific area is calculated as a magnification. Accordingly, the vibration calculation unit 13 calculates the amount $\Delta z$ [mm] of movement in the Z direction (normal direction), using the distance L[mm] between the principal point of the imaging element and the specific area, as given by Formula 5 below.

$$\Delta z = L \cdot dnz(t) \quad \text{(Formula 5)}$$

Furthermore, the amounts ($\Delta x$, $\Delta y$, $\Delta z$) of movement of the measurement target area are thus calculated for each frame of the captured time-series images. Accordingly, the amounts of movement calculated for each of the time-series images indicate vibration components of the measurement target area obtained at sampling intervals that correspond to the inverse number of the shooting frame rate. Therefore, the amounts of movement that are obtained for each of the time-series images and are calculated by the vibration calculation unit 13 can be regarded as vibration information (vibration waveform) of the measurement target area regarding the X direction, the Y direction, and the Z direction.

Apparatus Operation

Figure 2:
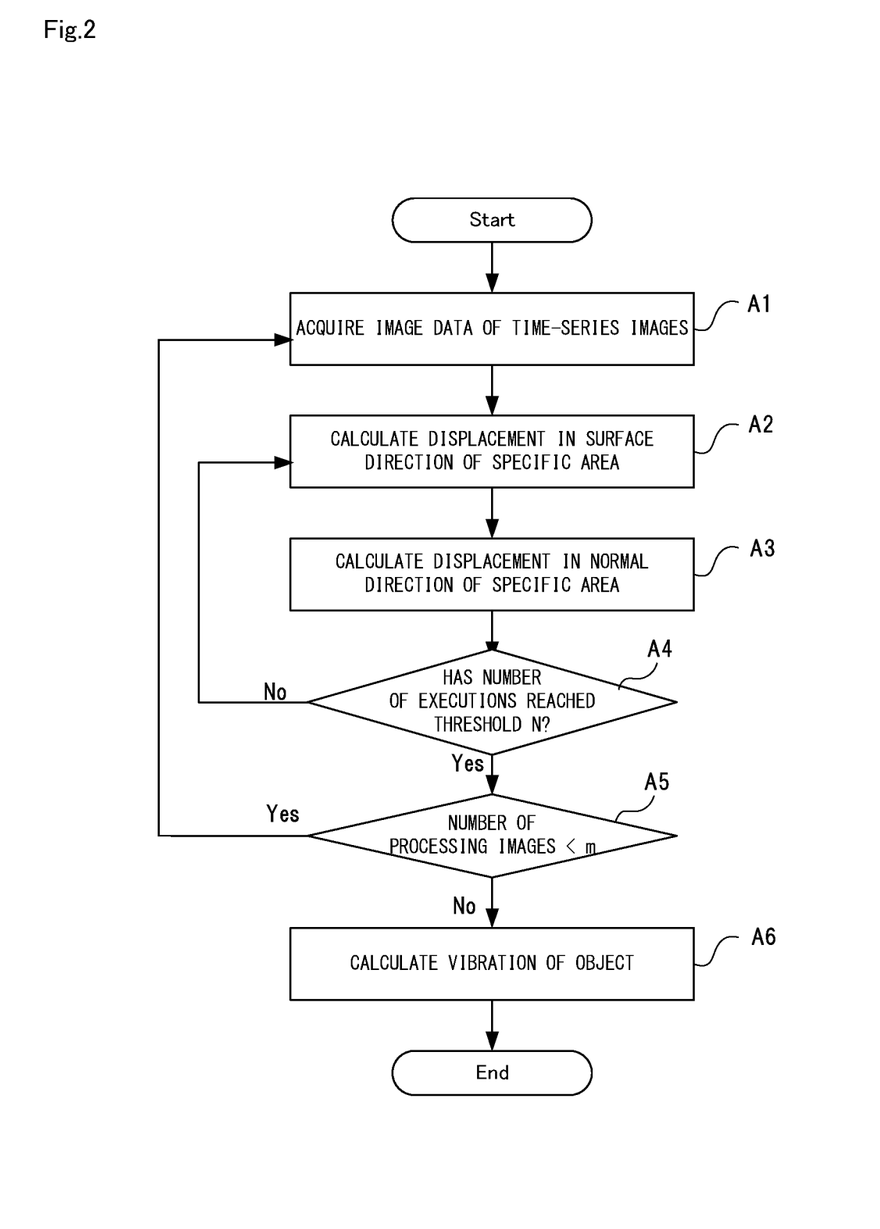
FIG. 2 is a flowchart illustrating an operation of the vibration measurement apparatus according to the example embodiment of the present invention.

The following will describe operations of the vibration measurement apparatus 10 according to the present example embodiment with reference to FIG. 2. FIG. 2 is a flowchart illustrating operations of the vibration measurement apparatus according to the example embodiment of the present invention. In the following description, FIG. 1 will be referenced as needed. Also, in the present example embodiment, a vibration measurement method is executed by operating the vibration measurement apparatus 10. Therefore, the following description of the operations of the vibration measurement apparatus substitutes for a description of the vibration measurement method according to the present example embodiment.

As shown in FIG. 2, first, the surface-direction displacement calculation unit 11 of the vibration measurement apparatus 10 acquires the image data of time-series images obtained by capturing a measurement target area on the object 30, the image data being output from the imaging apparatus 20 (step A1).

Then, the surface-direction displacement calculation unit 11 calculates, using the image data of the time-series images acquired in step A1, the displacements ($d1x$, $d1y$) in the surface direction of a specific area that includes the measurement target area in the image data (step A2).

Then, the surface-direction displacement calculation unit 11 gives the image data of the time-series images and the calculated displacements in the surface direction to the normal-direction displacement calculation unit 12.

Then, the normal-direction displacement calculation unit 12 calculates the displacement $d1z$ of the specific area in the normal direction, based on the image data of the time-series images and the displacements in the surface direction of the specific area that are given by the surface-direction displacement calculation unit 11 in step A2 (step A3).

Then, the normal-direction displacement calculation unit 12 determines whether or not the number of execution of steps A2 and A3 has reached a threshold N (step A4). The threshold N is set as appropriate through experiments executed in advance, or the like. The threshold N may be set to 1.

As a result of the determination in step A4, if the number of execution of steps A2 and A3 has not reached the threshold N, the normal-direction displacement calculation unit 12 instructs the surface-direction displacement calculation unit 11 to execute step A2 again. Accordingly, steps A2 and A3 are executed again. Furthermore, if the threshold N is set to 2, a configuration is also possible in which the processing of step A3 is not executed at the last trial.

On the other hand, as a result of the determination in step A4, if the number of execution of steps A2 and A3 has reached the threshold N, the normal-direction displacement calculation unit 12 determines whether or not the number of processing images based on which the displacements have been calculated is smaller than a threshold m (step A5). The threshold m is set as appropriate through experiments executed in advance, or the like.

As a result of the determination in step A5, if the number of processing images is smaller than the threshold m, the normal-direction displacement calculation unit 12 instructs the surface-direction displacement calculation unit 11 to execute step A1 again. In this case, steps A1 to A4 are executed on another processing image.

On the other hand, as a result of the determination in step A5, if the number of processing images is not smaller than the threshold m (the number is equal to the threshold m), the normal-direction displacement calculation unit 12 instructs the vibration calculation unit 13 to calculate vibrations. Accordingly, the vibration calculation unit 13 calculates vibrations of the object 30 based on the displacements in the surface direction of the specific area calculated in step A2, and the displacement in the normal direction of the specific area calculated in step A3, for each processing image (step A6).

Effects in Example Embodiment

According to the present example embodiment, as described above, vibrations of the object 30 in the three-dimensional directions are measured based on time-series images of the object 30 captured by the imaging apparatus 20. According to the present example embodiment, thus, it is possible to improve the accuracy of measuring vibrations of a structure that vibrates.

Program

A program according to the present example embodiment need only be a program that causes a computer to execute steps A1 to A6 shown in FIG. 2. The vibration measurement apparatus 10 and the vibration measurement method according to the present example embodiment can be realized by installing this program onto the computer and executing the program. In this case, a CPU (Central Processing Unit) of the computer functions as the surface-direction displacement calculation unit 11, the normal-direction displacement calculation unit 12, and the vibration calculation unit 13, and executes the processing.

The program according to the present example embodiment may also be executed by a computer system that includes a plurality of computers. In this case, for example, each computer may function as one of the surface-direction displacement calculation unit 11, the normal-direction displacement calculation unit 12, and the vibration calculation unit 13.

Modification 1

Figure 3:
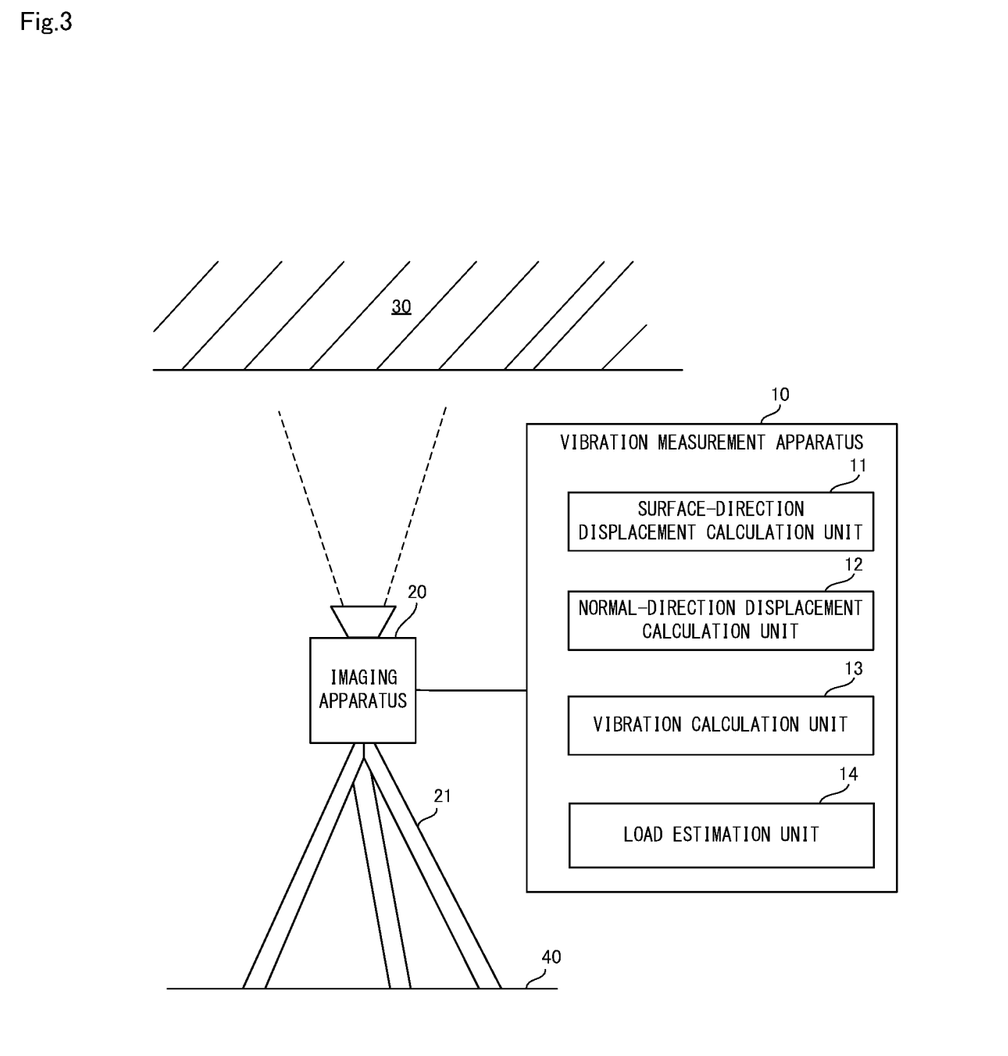
FIG. 3 is a block diagram illustrating a configuration of the vibration measurement apparatus according to Modification 1 of the example embodiment of the present invention.

Hereinafter, Modification 1 of the present example embodiment will be described. FIG. 3 is a block diagram illustrating a configuration of the vibration measurement apparatus according to Modification 1 of the example embodiment of the present invention.

As shown in FIG. 3, in Modification 1 of the present example embodiment, the vibration measurement apparatus 10 further includes a load estimation unit 14, in addition to the above-described surface-direction displacement calculation unit 11, normal-direction displacement calculation unit 12, and vibration calculation unit 13.

The load estimation unit 14 estimates a load applied to the object 30, based on the vibrations calculated by the vibration calculation unit 13. Specifically, the load estimation unit 14 calculates vibration characteristics of the object 30 with respect to the X direction, the Y direction, and the Z direction, based on the vibration waveform calculated by the vibration calculation unit 13. In this context, the vibration characteristics refer to information regarding the amplitude at a specific frequency. Also, the load estimation unit 14 estimates, based on the specified amplitude, the magnitude and direction of the load and external force applied to the object 30. The load estimation unit 14 also executes statistical processing on the estimated results, and, if, for example, the object 30 is a bridge, the load estimation unit 14 thereby counts the frequency of traffic for each class of vehicle weight.

Specifically, if the object 30 is a bridge, a displacement in the Z direction (beam deflection of the bridge) is correlated with the vehicle weight. Therefore, if information is provided in advance that relates to an amount of deflection (vibration in the Z direction) of the bridge when a vehicles with a known (defined) weight passes on the bridge, it will be possible to determine, based on the amount of deflection, how heavy or lightweight the passing vehicle is relative to the defined weight. In other words, by specifying the relationship between an amount of deflection of the bridge and the vehicle weight, a load applied to the object 30 can be estimated based on the vibration characteristics, as described above.

Modification 2

In the example shown in FIG. 1, the imaging apparatus 20 is fixed to the region 40 (for example, the ground) separated from the object, and the measurement target area is set to be located on the object 30, but the present example embodiment is not limited to this example.

Figure 4:
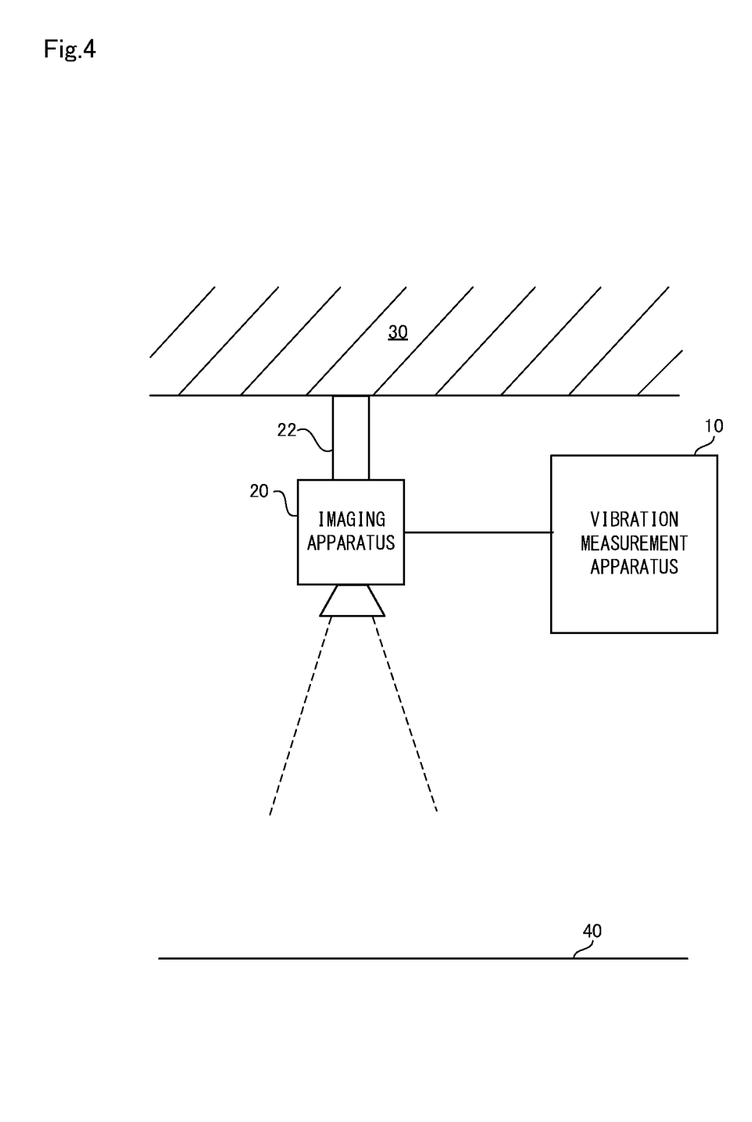
FIG. 4 is a diagram illustrating a configuration of the vibration measurement apparatus according to Modification 2 of the example embodiment of the present invention.

FIG. 4 is a diagram illustrating a configuration of the vibration measurement apparatus according to Modification 2 of the example embodiment of the present invention. In the example of FIG. 4, the imaging apparatus 20 is fixed to the object 30 with a fixture 22. Also, a measurement target area, which are captured as images, is set to be located on the region 40 separated from the object, that is, the ground, for example.

In the example shown in FIG. 4, if the object 30 vibrates, the imaging apparatus 20 also vibrates together. Accordingly, relative vibration components between the object 30 and the region 40 separated from the object are calculated based on obtained time-series images. Here, if the measurement target area, which are captured as time-series images, that is located on the region 40 separated from the object is fixed and is not moved, obtained vibration components can be regarded as vibration components of the object 30. As described above, also when the imaging apparatus 20 is fixed to the object 30 for which vibrations are to be measured, vibrations of the object 30 can be measured. Note that, in the example of FIG. 4, the imaging apparatus 20 need only be fixed to the object 30 so as to vibrate together, and may be fixed to any portion of the object 30.

Modification 3

Figure 5:
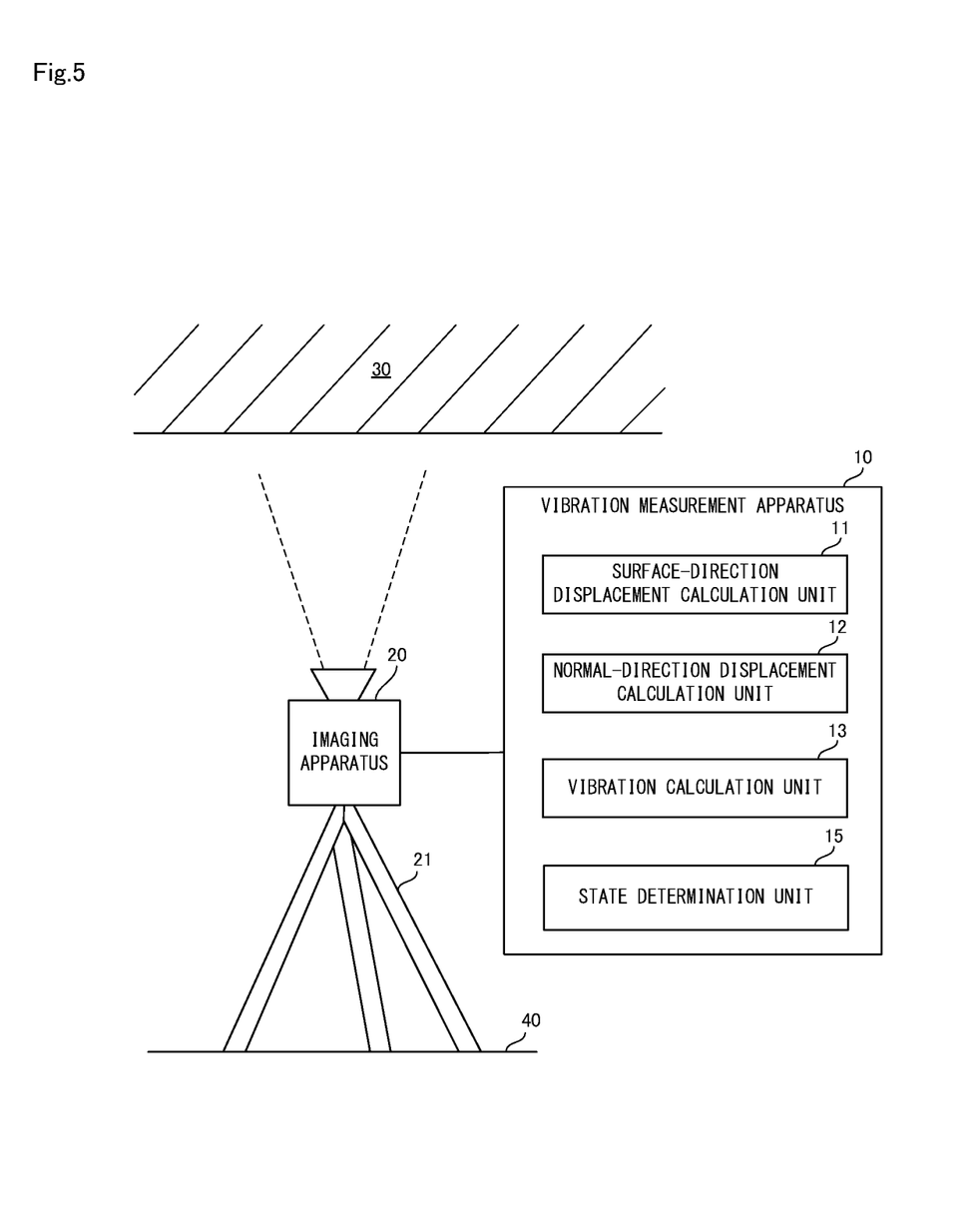
FIG. 5 is a block diagram illustrating a specific configuration of the vibration measurement apparatus according to Modification 3 of the example embodiment of the present invention.

FIG. 5 is a diagram illustrating a configuration of the vibration measurement apparatus according to Modification 3 of the example embodiment of the present invention. As shown in FIG. 5, in Modification 3, the vibration measurement apparatus 10 further includes a state determination unit 15 for determining a state of the object 30, in addition to the above-described surface-direction displacement calculation unit 11, normal-direction displacement calculation unit 12, and vibration calculation unit 13.

The state determination unit 15 determines the state of the object 30, based on the vibration information of the measurement target area on the object 30 calculated by the vibration calculation unit 13. Specifically, the state determination unit 15 calculates the characteristics of the vibration waveforms in the X direction, the Y direction, and the Z direction calculated by the vibration calculation unit 13. Examples of the characteristics of the vibration waveforms include the maximum/minimum amplitudes of each vibration waveform itself, and the period/the number of vibrations. Also, examples of the characteristics of the vibration waveforms further include an amplitude of each frequency calculated by performing frequency analysis on the vibration waveform, and the number of inherent vibrations and an amplitude of the frequency.

Then, the state determination unit 15 compares the calculated characteristics of each vibration waveform with a preset threshold to determine the state of the object 30. For example, it is assumed that the object 30 is a bridge, which is an infrastructural component, and the measurement target area is a bridge beam (hereinafter, simply denoted as "beam"). At this time, if the maximum amplitude of the vibration waveform in the Z direction that corresponds to a deflection of the beam is abnormally larger than the preset threshold (here, an acceptable value), it is possible to determine that an abnormality that may affect the load bearing ability of the bridge is occurring in the bridge. Similarly, if the numbers of inherent vibrations in the X direction and the Y direction, which correspond to components of horizontal vibrations of the beam, and the amplitude of the frequency are abnormally larger than thresholds (here, values calculated from a design value and a safety factor), it is conceivable that some sort of state abnormality is occurring in the bridge.

As in the above-described example, the state determination unit 15 determines whether or not an abnormality has occurred in the object 30. Furthermore, the above-described thresholds may be obtained based on the design value and the safety factor of the infrastructural component, or based on the design standards or the maintenance standards of the infrastructural component, or the values described in the specification.

With such a configuration, according to Modification 3, the state of the object 30 can also be determined based on measured vibrations, and thus, particularly if the object 30 is an infrastructural component, a deterioration state can also be specified.

Moreover, Modification 3 may also be applied to Modification 1. In this case, if a load is estimated by the load estimation unit 14, the state determination unit 15 determines the state of the object 30 based on the estimated load. For example, if, as described above, the frequency of traffic is counted for each class of vehicle weight, the state determination unit 15 can perform, based on the counting result, cumulative fatigue damage estimation in a beam or a floor slab of the bridge. Also, in this case, the state determination unit 15 can also perform abnormality determination based on the result of the cumulative fatigue damage estimation.

Physical Configuration

Figure 6:
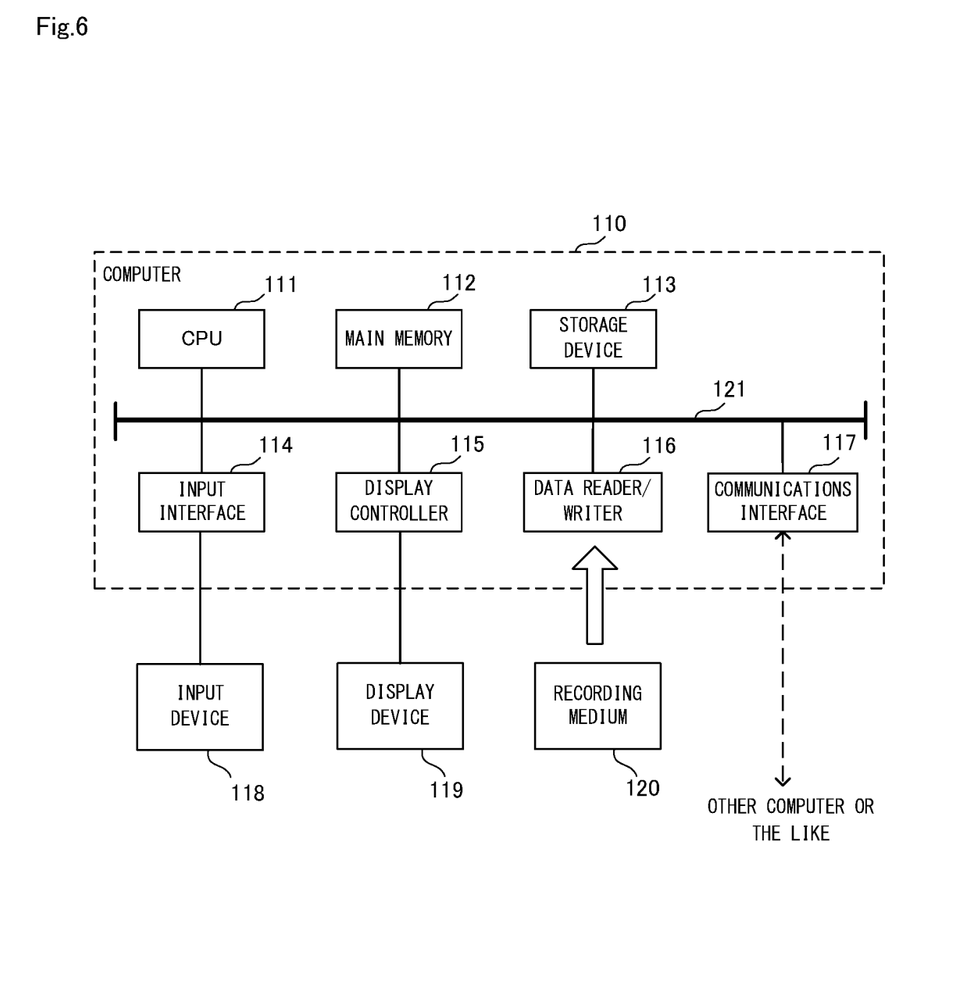
FIG. 6 is a block diagram illustrating an example of a computer that realizes a vibration measurement apparatus 10 according to the example embodiment of the present invention.

Hereinafter, a computer that realizes the vibration measurement apparatus 10 by executing a program according to the present example embodiment will be described with reference to FIG. 6. FIG. 6 is a block diagram illustrating an example of a computer that realizes the vibration measurement apparatus 10 according to the example embodiment of the present invention.

As shown in FIG. 6, a computer 110 includes a CPU 111, a main memory 112, a storage device 113, an input interface 114, and a display controller 115, a data reader/writer 116, and a communication interface 117. These units are connected to each other via a bus 121 so as to be able to perform data communication with each other.

The CPU 111 loads a program (codes) according to the present example embodiment, stored in the storage device 113, onto the main memory 112, and executes the codes in a predetermined order to perform various calculations. The main memory 112 is typically a volatile storage device such as a DRAM (Dynamic Random Access Memory). Also, the program according to the present example embodiment is provided in a state of being stored in the computer-readable recording medium 120. Note that the program according to the present example embodiment may be distributed over the Internet connected via the communication interface 117.

Specific examples of the storage device 113 include, in addition to a hard disk drive, a semiconductor storage device such as a flash memory. The input interface 114 mediates data transmission between the CPU 111 and an input device 118 such as a keyboard or a mouse. The display controller 115 is connected to a display device 119 and controls display by the display device 119.

The data reader/writer 116 mediates data transmission between the CPU 111 and the recording medium 120, and executes reading a program from the recording medium 120 and writing processing results of the computer 110 into the recording medium 120. The communication interface 117 mediates data transmission between the CPU 111 and another computer.

Specific examples of the recording medium 120 include a general-purpose semiconductor storage device such as a CF (Compact Flash (registered trademark)) or a SD (Secure Digital), a magnetic recording medium such as a Flexible Disk, and an optical recording medium such as a CD-ROM (Compact Disk Read Only Memory).

Note that the vibration measurement apparatus 10 according to the present example embodiment can be realized by using hardware that corresponds to the above-described respective units, rather than by a computer on which the program is installed. Furthermore, the vibration measurement apparatus 10 may be realized in part by a program, and the remaining portion may be realized by hardware.

The example embodiment described above can be partially or wholly realized by Supplementary Notes 1 to 18 described below, but the invention is not limited to the following description.

Supplementary Note 1

A vibration measurement apparatus for measuring vibrations of an object, comprising:

a surface-direction displacement calculation unit configured to calculate, based on time-series images of a measurement target area on the object that are output from an imaging apparatus, a displacement in a surface direction of the measurement target area;

a normal-direction displacement calculation unit configured to calculate a displacement in a normal direction of the measurement target area, based on the time-series images and the displacement in the surface direction of the measurement target area; and a vibration calculation unit configured to calculate vibrations of the object, based on the calculated displacement in the surface direction of the measurement target area and the calculated displacement in the normal direction of the measurement target area.

Supplementary Note 2

The vibration measurement apparatus according to Supplementary Note 1, wherein the time-series images are time-series images of the measurement target area on the object that are output from the imaging apparatus fixed to a region separated from the object, or time-series images of a measurement target area located on the region separated from the object that are output from the imaging apparatus fixed to the object.

Supplementary Note 3

The vibration measurement apparatus according to Supplementary Note 1 or 2, wherein the surface-direction displacement calculation unit sets one of the time-series images as a reference image, and another image as a processing image, compares and matches the processing image with the reference image, specifies a position of the measurement target area that has the highest matching level, and calculates a displacement in the surface direction of the measurement target area, the normal-direction displacement calculation unit creates an enlarged image and a reduced image of the reference image by setting the central positions of the enlarged image and the reduced image based on the displacement in the surface direction of the measurement target area, and the normal-direction displacement calculation unit further compares and matches the processing image with the enlarged image and the reduced image, specifies the enlarged image or the reduced image that has the highest matching level, calculates a magnification of the processing image relative to the reference image, and regards the calculated magnification as a displacement in the normal direction of the measurement target area.

Supplementary Note 4

The vibration measurement apparatus according to Supplementary Note 3, wherein, when the displacement in the normal direction of the measurement target area is calculated by the normal-direction displacement calculation unit, the surface-direction displacement calculation unit again calculates a displacement in the surface direction of the measurement target area using the enlarged image or the reduced image created by the normal-direction displacement calculation unit, and the normal-direction displacement calculation unit again calculates the displacement in the normal direction of the measurement target area, using the again calculated displacement in the surface direction of the measurement target area.

Supplementary Note 5

The vibration measurement apparatus according to any one of Supplementary Notes 1 to 4, wherein the vibration calculation unit calculates a vibration in the surface direction of the measurement target area, based on the displacement in the surface direction of the measurement target area and information regarding imaging of the imaging apparatus, and the vibration calculation unit calculates a vibration in the normal direction of the measurement target area, based on the displacement in the normal direction of the measurement target area and a distance between the imaging apparatus and the object.

Supplementary Note 6

The vibration measurement apparatus according to any one of Supplementary Notes 1 to 5, wherein the surface direction of the measurement target area includes a direction that corresponds to a horizontal direction of the time-series images, and a direction that corresponds to a perpendicular direction of the time-series images.

Supplementary Note 7

A vibration measurement method for measuring vibrations of an object, comprising:

(a) a step of calculating, based on time-series images of a measurement target area on the object that are output from an imaging apparatus, a displacement in a surface direction of the measurement target area;

(b) a step of calculating a displacement in a normal direction of the measurement target area, based on the time-series images and the displacement in the surface direction of the measurement target area; and (c) a step of calculating vibrations of the object, based on the calculated displacement in the surface direction of the measurement target area and the calculated displacement in the normal direction of the measurement target area.

Supplementary Note 8

The vibration measurement method according to Supplementary Note 7, wherein the time-series images are time-series images of the measurement target area on the object that are output from the imaging apparatus fixed to a region separated from the object, or time-series images of a measurement target area located on the region separated from the object that are output from the imaging apparatus fixed to the object.

Supplementary Note 9

The vibration measurement method according to Supplementary Note 7 or 8, wherein, in the (a) step, one of the time-series images is set as a reference image, and another image is set as a processing image, the processing image is compared and matched with the reference image, a position of the measurement target area that has the highest matching level is specified, and a displacement in the surface direction of the measurement target area is calculated, and In the (b) step, an enlarged image and a reduced image of the reference image are created by setting the central positions of the enlarged image and the reduced image based on the displacement in the surface direction of the measurement target area, and the processing image is further compared and matched with the enlarged image and the reduced image, the enlarged image or the reduced image that has the highest matching level is specified, a magnification of the processing image relative to the reference image is calculated, and the calculated magnification is regarded as a displacement in a normal direction of the measurement target area.

Supplementary Note 10

The vibration measurement method according to Supplementary Note 9, further comprising:

(d) a step of, when a displacement in the normal direction of the measurement target area is calculated in the (b) step, again calculating a displacement in the surface direction of the measurement target area using the enlarged image or the reduced image created in the (b) step; and (e) a step of again calculating the displacement in the normal direction of the measurement target area, using the displacement in the surface direction of the measurement target area calculated again in the (d) step.

Supplementary Note 11

The vibration measurement method according to any one of Supplementary Notes 7 to 10, wherein, in the (c) step, a vibration in the surface direction of the measurement target area is calculated, based on the displacement in the surface direction of the measurement target area and information regarding imaging of the imaging apparatus, and a vibration in the normal direction of the measurement target area is calculated, based on the displacement in the normal direction of the measurement target area and a distance between the imaging apparatus and the object.

Supplementary Note 12

The vibration measurement method according to any one of Supplementary Notes 7 to 11, wherein the surface direction of the measurement target area includes a direction that corresponds to a horizontal direction of the time-series images, and a direction that corresponds to a perpendicular direction of the time-series images.

Supplementary Note 13

A computer-readable recording medium having recorded thereon a program for measuring vibrations of an object, using a computer, the program including instructions that cause the computer to carry out:

(a) a step of calculating, based on time-series images of a measurement target area on the object that are output from an imaging apparatus, a displacement in a surface direction of the measurement target area;

(b) a step of calculating a displacement in a normal direction of the measurement target area, based on the time-series images and the displacement in the surface direction of the measurement target area; and (c) a step of calculating vibrations of the object, based on the calculated displacement in the surface direction of the measurement target area and the calculated displacement in the normal direction of the measurement target area.

Supplementary Note 14

The computer-readable recording medium according to Supplementary Note 13, wherein the time-series images are time-series images of the measurement target area on the object that are output from the imaging apparatus fixed to a region separated from the object, or time-series images of a measurement target area located on the region separated from the object that are output from the imaging apparatus fixed to the object.

Supplementary Note 15

The computer-readable recording medium according to Supplementary Note 13 or 14, wherein, in the (a) step, one of the time-series images is set as a reference image, and another image is set as a processing image, the processing image is compared and matched with the reference image, a position of the measurement target area that has the highest matching level is specified, and a displacement in the surface direction of the measurement target area is calculated, and In the (b) step, an enlarged image and a reduced image of the reference image are created by setting the central positions of the enlarged image and the reduced image based on the displacement in the surface direction of the measurement target area, and the processing image is further compared and matched with the enlarged image and the reduced image, the enlarged image or the reduced image that has the highest matching level is specified, a magnification of the processing image relative to the reference image is calculated, and the calculated magnification is regarded as a displacement in a normal direction of the measurement target area.

Supplementary Note 16

The computer-readable recording medium according to Supplementary Note 15, the program further including instructions that cause the computer to carry out:

(d) a step of, when a displacement in the normal direction of the measurement target area is calculated in the (b) step, again calculating a displacement in the surface direction of the measurement target area using the enlarged image or the reduced image created in the (b) step; and (e) a step of again calculating the displacement in the normal direction of the measurement target area, using the displacement in the surface direction of the measurement target area calculated again in the (d) step.

Supplementary Note 17

The computer-readable recording medium according to any one of Supplementary Notes 13 to 16, wherein, in the (c) step, a vibration in the surface direction of the measurement target area is calculated, based on the displacement in the surface direction of the measurement target area and information regarding imaging of the imaging apparatus, and a vibration in the normal direction of the measurement target area is calculated, based on the displacement in the normal direction of the measurement target area and a distance between the imaging apparatus and the object.

Supplementary Note 18

The computer-readable recording medium according to any one of Supplementary Notes 13 to 17, wherein the surface direction of the measurement target area includes a direction that corresponds to a horizontal direction of the time-series images, and a direction that corresponds to a perpendicular direction of the time-series images.

INDUSTRIAL APPLICABILITY

As described above, according to the present invention, it is possible to improve the accuracy of measuring vibrations of a structure that vibrates. The present invention is useful especially in the field of maintenance and management, and abnormality detection of infrastructural components such as bridges, roads, buildings, and facilities.

LIST OF REFERENCE SIGNS

10 Vibration measurement apparatus
11 Surface-direction displacement calculation unit
12 Normal-direction displacement calculation unit
13 Vibration calculation unit
14 Load estimation unit
15 State determination unit
20 Imaging apparatus
21 Fixture
22 Fixture
30 Object
40 Region separated from an object (ground)
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A vibration measurement apparatus for measuring vibrations of an object, comprising:
a surface-direction displacement calculation unit configured to calculate, based on time-series images of a measurement target area on the object that are output from an imaging apparatus, a displacement in a surface direction of the measurement target area;
a normal-direction displacement calculation unit configured to calculate a displacement in a normal direction of the measurement target area, based on the time-series images and the displacement in the surface direction of the measurement target area; and
a vibration calculation unit configured to calculate vibrations of the object, based on the calculated displacement in the surface direction of the measurement target area and the calculated displacement in the normal direction of the measurement target area,
wherein the surface-direction displacement calculation unit sets one of the time-series images as a reference image, and another image as a processing image, compares and matches the processing image with the reference image, specifies a position of the measurement target area that has the highest matching level, and calculates a displacement in the surface direction of the measurement target area,
the normal-direction displacement calculation unit creates an enlarged image and a reduced image of the reference image by setting the central positions of the enlarged image and the reduced image based on the displacement in the surface direction of the measurement target area, and
the normal-direction displacement calculation unit further compares and matches the processing image with the enlarged image and the reduced image, specifies the enlarged image or the reduced image that has the highest matching level, calculates a magnification of the processing image relative to the reference image, and regards the calculated magnification as a displacement in the normal direction of the measurement target area.

2. The vibration measurement apparatus according to claim 1,
wherein the time-series images are time-series images of the measurement target area on the object that are output from the imaging apparatus fixed to a region separated from the object, or time-series images of a measurement target area located on the region separated from the object that are output from the imaging apparatus fixed to the object.

3. The vibration measurement apparatus according to claim 1,
wherein, when the displacement in the normal direction of the measurement target area is calculated by the normal-direction displacement calculation unit, the surface-direction displacement calculation unit again calculates a displacement in the surface direction of the measurement target area using the enlarged image or the reduced image created by the normal-direction displacement calculation unit, and
the normal-direction displacement calculation unit again calculates the displacement in the normal direction of the measurement target area, using the again calculated displacement in the surface direction of the measurement target area.

4. The vibration measurement apparatus according to claim 1,
wherein the vibration calculation unit calculates a vibration in the surface direction of the measurement target area, based on the displacement in the surface direction of the measurement target area and information regarding imaging of the imaging apparatus, and
the vibration calculation unit calculates a vibration in the normal direction of the measurement target area, based on the displacement in the normal direction of the measurement target area and a distance between the imaging apparatus and the object.

5. The vibration measurement apparatus according to claim 1,
wherein the surface direction of the measurement target area includes a direction that corresponds to a horizontal direction of the time-series images, and a direction that corresponds to a perpendicular direction of the time-series images.

6. A vibration measurement method for measuring vibrations of an object, comprising:
calculating, based on time-series images of a measurement target area on the object that are output from an imaging apparatus, a displacement in a surface direction of the measurement target area;

calculating a displacement in a normal direction of the measurement target area, based on the time-series images and the displacement in the surface direction of the measurement target area; and calculating vibrations of the object, based on the calculated displacement in the surface direction of the measurement target area and the calculated displacement in the normal direction of the measurement target area, wherein, one of the time-series images is set as a reference image, and another image is set as a processing image, the processing image is compared and matched with the reference image, a position of the measurement target area that has the highest matching level is specified, and a displacement in the surface direction of the measurement target area is calculated, and an enlarged image and a reduced image of the reference image are created by setting the central positions of the enlarged image and the reduced image based on the displacement in the surface direction of the measurement target area, and the processing image is further compared and matched with the enlarged image and the reduced image, the enlarged image or the reduced image that has the highest matching level is specified, a magnification of the processing image relative to the reference image is calculated, and the calculated magnification is regarded as a displacement in a normal direction of the measurement target area.

7. The vibration measurement method according to claim 6,
wherein the time-series images are time-series images of the measurement target area on the object that are output from the imaging apparatus fixed to a region separated from the object, or time-series images of a measurement target area located on the region separated from the object that are output from the imaging apparatus fixed to the object.

8. The vibration measurement method according to claim 6, further comprising:
when a displacement in the normal direction of the measurement target area is calculated again calculating a displacement in the surface direction of the measurement target area using the enlarged image or the reduced image created in the (b) step; and
again calculating the displacement in the normal direction of the measurement target area, using the displacement in the surface direction of the measurement target area calculated again in the (d) step.

9. The vibration measurement method according to claim 6,
wherein, a vibration in the surface direction of the measurement target area is calculated, based on the displacement in the surface direction of the measurement target area and information regarding imaging of the imaging apparatus, and
a vibration in the normal direction of the measurement target area is calculated, based on the displacement in the normal direction of the measurement target area and a distance between the imaging apparatus and the object.

10. The vibration measurement method according to claim 6,
wherein the surface direction of the measurement target area includes a direction that corresponds to a horizontal direction of the time-series images, and a direction that corresponds to a perpendicular direction of the time-series images.

11. A non-transitory computer-readable recording medium having recorded thereon a program for measuring vibrations of an object, using a computer,
the program including instructions that cause the computer to carry out:
calculating, based on time-series images of a measurement target area on the object that are output from an imaging apparatus, a displacement in a surface direction of the measurement target area;
calculating a displacement in a normal direction of the measurement target area, based on the time-series images and the displacement in the surface direction of the measurement target area; and
calculating vibrations of the object, based on the calculated displacement in the surface direction of the measurement target area and the calculated displacement in the normal direction of the measurement target area,
wherein, one of the time-series images is set as a reference image, and another image is set as a processing image, the processing image is compared and matched with the reference image, a position of the measurement target area that has the highest matching level is specified, and a displacement in the surface direction of the measurement target area is calculated, and
an enlarged image and a reduced image of the reference image are created by setting the central positions of the enlarged image and the reduced image based on the displacement in the surface direction of the measurement target area, and
the processing image is further compared and matched with the enlarged image and the reduced image, the enlarged image or the reduced image that has the highest matching level is specified, a magnification of the processing image relative to the reference image is calculated, and the calculated magnification is regarded as a displacement in a normal direction of the measurement target area.

12. The non-transitory computer-readable recording medium according to claim 11,
wherein the time-series images are time-series images of the measurement target area on the object that are output from the imaging apparatus fixed to a region separated from the object, or time-series images of a measurement target area located on the region separated from the object that are output from the imaging apparatus fixed to the object.

13. The non-transitory computer-readable recording medium according to claim 11,
the program further including instructions that cause the computer to carry out:
when a displacement in the normal direction of the measurement target area is calculated again calculating a displacement in the surface direction of the measurement target area using the enlarged image or the reduced image created in the (b) step; and
calculating the displacement in the normal direction of the measurement target area, using the displacement in the surface direction of the measurement target area calculated again in the (d) step.

14. The non-transitory computer-readable recording medium according to claim 11,
wherein, a vibration in the surface direction of the measurement target area is calculated, based on the displacement in the surface direction of the measurement target area and information regarding imaging of the imaging apparatus, and a vibration in the normal direction of the measurement target area is calculated, based on the displacement in the normal direction of the measurement target area and a distance between the imaging apparatus and the object.

15. The non-transitory computer-readable recording medium according to claim 11,
wherein the surface direction of the measurement target area includes a direction that corresponds to a horizontal direction of the time-series images, and a direction that corresponds to a perpendicular direction of the time-series images.

* * * * *